United States Patent
Huang et al.

(10) Patent No.: US 9,736,548 B2
(45) Date of Patent: Aug. 15, 2017

(54) MULTIPATH RATE ADAPTATION

(75) Inventors: Xiaolong Huang, San Diego, CA (US);
Vijayalakshmi R. Raveendran, San Diego, CA (US); Xun Luo, San Diego, CA (US); PhaniKumar K. Bhamidipati, San Diego, CA (US); Soham V. Sheth, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1314 days.

(21) Appl. No.: 13/155,762

(22) Filed: Jun. 8, 2011

(65) Prior Publication Data

US 2012/0317300 A1 Dec. 13, 2012

(51) Int. Cl.
| | |
|---|---|
| *G06F 15/16* | (2006.01) |
| *H04L 27/28* | (2006.01) |
| *H04N 21/647* | (2011.01) |
| *H04L 29/06* | (2006.01) |
| *H04N 21/2385* | (2011.01) |
| *H04N 21/24* | (2011.01) |
| *H04N 21/442* | (2011.01) |

(52) U.S. Cl.
CPC ... *H04N 21/64738* (2013.01); *H04L 65/4092* (2013.01); *H04L 65/607* (2013.01); *H04L 65/80* (2013.01); *H04N 21/2385* (2013.01); *H04N 21/2402* (2013.01); *H04N 21/44209* (2013.01)

(58) Field of Classification Search
CPC ......... H04N 21/64738; H04N 21/2385; H04N 21/2402; H04N 21/44209; H04L 65/4092; H04L 65/607; H04L 65/80
USPC .................................. 709/231, 227; 375/260
See application file for complete search history.

(56) References Cited

U.S. PATENT DOCUMENTS

| | | | |
|---|---|---|---|
| 6,862,618 B1 | 3/2005 | Gray et al. | |
| 7,606,164 B2 | 10/2009 | Anandakumar et al. | |
| 2002/0080726 A1* | 6/2002 | Klassen et al. | 370/252 |

(Continued)

FOREIGN PATENT DOCUMENTS

| | | |
|---|---|---|
| CN | 1988664 A | 6/2007 |
| CN | 101268710 A | 9/2008 |

(Continued)

OTHER PUBLICATIONS

Wang et al., "Multiple Description Code for Video Delivery", Jan. 2005, p. 1-14, Proceedings of the IEEE, vol. 93, No. 1.*

(Continued)

*Primary Examiner* — Taylor Elfervig
(74) *Attorney, Agent, or Firm* — Brent A. Boyd

(57) ABSTRACT

An end-to-end multimedia streaming system can include a streaming server and a destination. The streaming server includes a content source, which sends multiple description coding-encoded content over a plurality of paths to the destination. The destination includes an aggregator for aggregating the descriptions from the multiple paths, decoding and recombining them to recover the content. A feedback sender at the destination generates traffic performance variables based on the channel conditions of the multiple paths, and sends these variables to a feedback receiver at the streaming server. The feedback receiver utilizes the feedback information to make adjustments to the transmissions of the content, and to synchronize the transmissions over the multiple paths.

42 Claims, 10 Drawing Sheets

(56) References Cited

U.S. PATENT DOCUMENTS

| | | | |
|---|---|---|---|
| 2002/0103919 A1* | 8/2002 | Hannaway | H04N 21/23406 709/231 |
| 2002/0116715 A1 | 8/2002 | Apostolopoulos | |
| 2003/0007515 A1* | 1/2003 | Apostolopoulos et al. | 370/503 |
| 2004/0218530 A1* | 11/2004 | Magal | H04L 43/024 370/235 |
| 2006/0039280 A1 | 2/2006 | Anandakumar et al. | |
| 2006/0083270 A1* | 4/2006 | Lee et al. | 370/521 |
| 2009/0327918 A1* | 12/2009 | Aaron et al. | 715/751 |
| 2010/0091893 A1* | 4/2010 | Gorokhov | 375/260 |
| 2010/0121971 A1 | 5/2010 | Shao et al. | |
| 2011/0176060 A1 | 7/2011 | Lee et al. | |
| 2013/0054819 A1* | 2/2013 | Goldfein et al. | 709/227 |

FOREIGN PATENT DOCUMENTS

| | | |
|---|---|---|
| JP | H11239134 A | 8/1999 |
| JP | 2004538690 A | 12/2004 |
| JP | 2005512390 A | 4/2005 |
| JP | 2007300498 A | 11/2007 |

OTHER PUBLICATIONS

Yao Wang, A. R. Reibman and Shunan Lin, "Multiple Description Coding for Video Delivery," in Proceedings of the IEEE, vol. 93, No. 1, pp. 57-70, Jan. 2005.*

Kim et al., "Network-Adaptive Video Streaming Using Multiple Description Coding and Path Diversity", School of Electrical Engineering Georgia Institute of Technology, 2003 IEEE, pp. 653-656.

Gogate N. et al., "Supporting Image and Video Applications in a Multihop Radio Environment Using Path Diversity and Multiple Description Coding", IEEE Transactions on Circuits and Systems for Video Technology, vol. 12, No. 9, Sep. 2002. pp. 777-792.

International Search Report and Written Opinion—PCT/US2012/041426—ISA/EPO—Oct. 24, 2012.

* cited by examiner

MULTIPATH RATE ADAPTATION

BACKGROUND

Field

Aspects of the present disclosure relate generally to telecommunication systems, and more particularly, to multimedia streaming systems utilizing multiple description coding.

Background

Multimedia content can be provided in an end-to-end system. Currently, many such end-to-end systems include a rate adaptation feature, wherein a single description of the multimedia is transmitted from a content source to a destination over a single path. In a system utilizing multiple description coding (MDC), wherein multimedia content is divided into a plurality of descriptions for delivery from a source to an aggregator, the descriptions can be provided over multiple paths. In this way, the system can have increased robustness, where the content might be recovered despite one or more of the descriptions being lost. Further, overhead over any one of the paths is reduced relative to other systems that only utilize a single path, since the descriptions may include lower resolution versions of the content, or only certain portions of the content.

However, when a mobile device is utilized as a streaming content server, channel conditions can vary greatly over time. This can result in time-dependent capabilities of a channel to carry the streaming content. Therefore, there remains a desire in the art for improved multimedia streaming capabilities for mobile content servers.

SUMMARY

In a system utilizing multiple description coding (MDC), wherein multimedia content is encoded into a plurality of descriptions for delivery from a source to an aggregator, the descriptions can be provided over multiple paths. In this way, the system can have increased robustness, where the content might be recovered despite one or more of the descriptions being lost. Further, overhead over any one of the paths is reduced relative to other systems that only utilize a single path, since the descriptions may include lower resolution versions of the content, or only certain portions of the content.

In accordance with various aspects of the present disclosure, when multimedia content is coded into multiple descriptions and delivered over multiple paths, in accordance with various conditions of each of the paths, rate adaptation may be coordinated amongst each of the paths to maintain a good and consistent quality of experience (QoE). As opposed to a system that adapts a rate of transmission for a single path, various aspects of the present disclosure take into account such factors as inter-path performance statistics to improve synchronization among the multiple descriptions.

In one aspect, the disclosure provides a method of multipath rate adaptation, including transmitting information on each of a plurality of paths, receiving feedback information including one or more traffic performance variables for the plurality of paths, adapting the transmitting on one or more of the paths in response to the feedback information, and synchronizing among the plurality of paths in correspondence to the adapting of the transmitting.

Another aspect of the disclosure provides a method of providing feedback for multipath rate adaptation, including receiving information over a plurality of paths, and providing feedback information responsive to the information, wherein the feedback information includes an information element corresponding to a relationship between at least two of the plurality of paths.

Another aspect of the disclosure provides an apparatus for multipath rate adaptation, including means for transmitting information on each of a plurality of paths, means for receiving feedback information including one or more traffic performance variables for the plurality of paths, means for adapting the transmitting on one or more of the paths in response to the feedback information, and means for synchronizing among the plurality of paths in correspondence to the adapting of the transmitting.

Another aspect of the disclosure provides an apparatus for providing feedback for multipath rate adaptation, including means for receiving information over a plurality of paths, and means for providing feedback information responsive to the information, wherein the feedback information includes an information element corresponding to a relationship between at least two of the plurality of paths.

Another aspect of the disclosure provides a computer program product, including a computer-readable medium. Here, the computer-readable medium includes code for transmitting information on each of a plurality of paths, code for receiving feedback information comprising one or more traffic performance variables for the plurality of paths, code for adapting the transmitting on one or more of the paths in response to the feedback information, and code for synchronizing among the plurality of paths in correspondence to the adapting of the transmitting.

Another aspect of the disclosure provides a computer program product, including a computer-readable medium. Here, the computer-readable medium includes code for receiving information over a plurality of paths, and code for providing feedback information responsive to the information, wherein the feedback information includes an information element corresponding to a relationship between at least two of the plurality of paths.

Another aspect of the disclosure provides an apparatus for multipath rate adaptation, including at least one processor and a memory coupled to the at least one processor. Here, the at least one processor is configured to transmit information on each of a plurality of paths, to receive feedback information comprising one or more traffic performance variables for the plurality of paths, to adapt the transmitting on one or more of the paths in response to the feedback information; and to synchronize among the plurality of paths in correspondence to the adapting of the transmitting.

Another aspect of the disclosure provides an apparatus providing feedback for multipath rate adaptation, including at least one processor and a memory coupled to the at least one processor. Here, the at least one processor is configured to receive information over a plurality of paths, and to provide feedback information responsive to the information, wherein the feedback information comprises an information element corresponding to a relationship between at least two of the plurality of paths.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
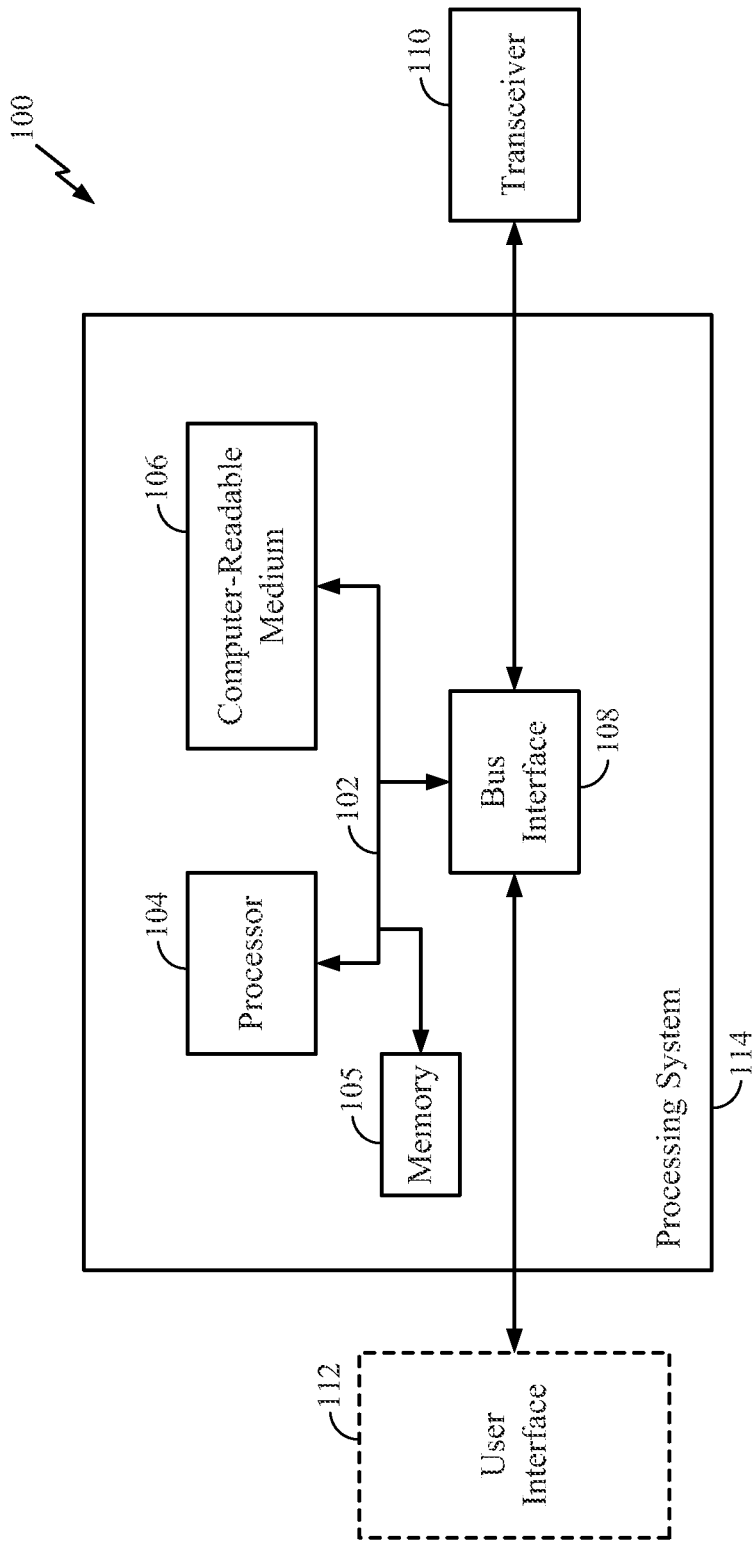
FIG. 1 is a block diagram illustrating an example of a hardware implementation for an apparatus employing a processing system.

FIG. 1 is a block diagram illustrating an example of a hardware implementation for an apparatus 100 employing a processing system 114. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, the memory 105, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
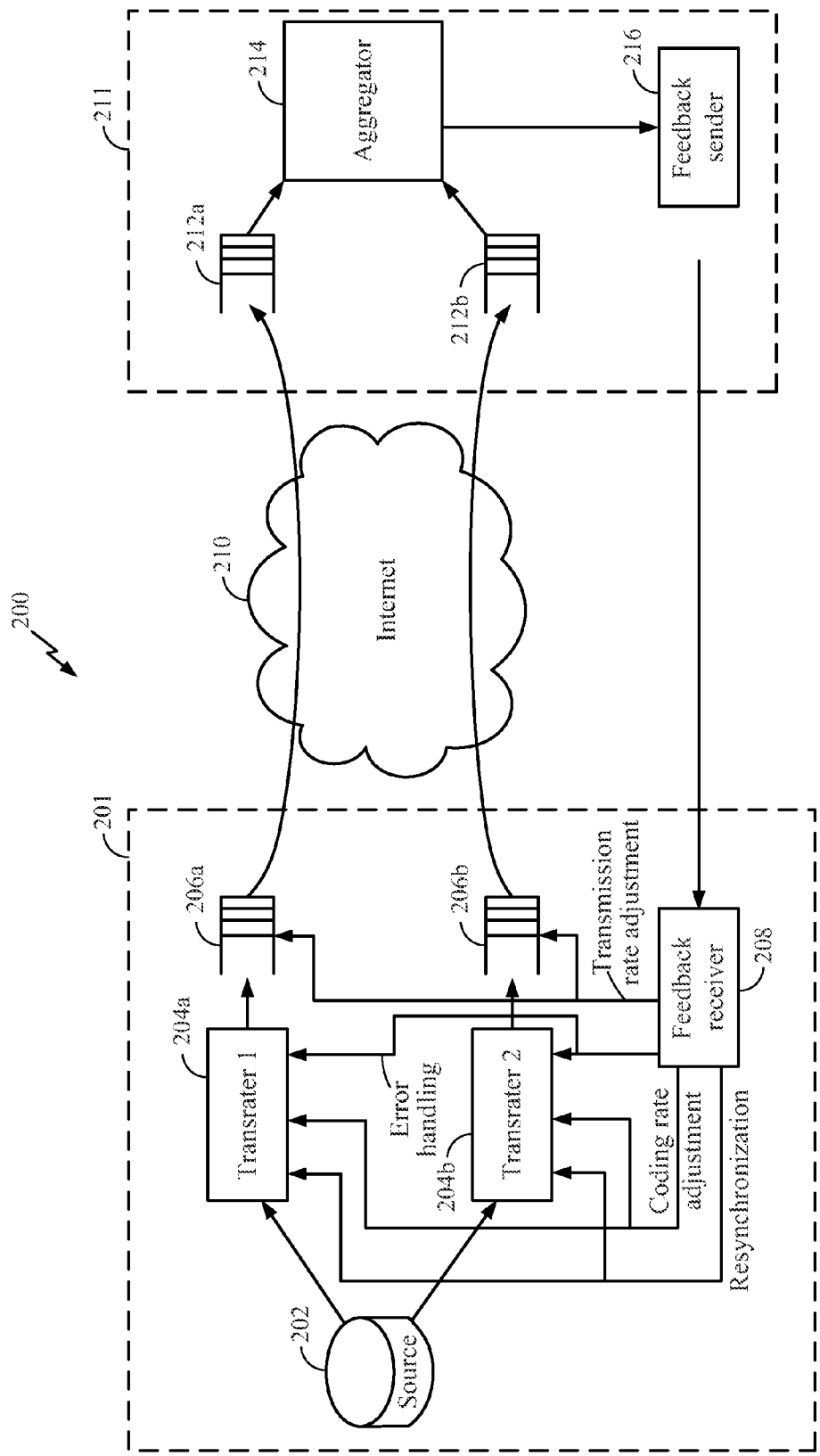
FIG. 2 is a simplified block diagram illustrating an end-to-end multipath rate adaption system.

FIG. 2 is a simplified block diagram illustrating an end-to-end multipath rate adaption system 200 in accordance with an aspect of the present disclosure. The rate adaptation system provides multiple data paths from the source 202 to the aggregator 214, and a single feedback path from the aggregator 214 to the source 202.

A streaming server 201 may be any suitable node for streaming MDC content to a destination 211. For example, the streaming server 201 may be a mobile phone, a personal computer, a server, or any other suitable computing device capable of processing streaming the content as described herein. In some examples, the streaming server 201 may include a plurality of apparatus, such as a server and one or more source helpers (not illustrated). For example, each of a plurality of nodes may transmit one or more descriptions on a separate respective uplink to provide additional diversity of transmission. The streaming server 201 may include one or more processing systems 114 as illustrated in FIG. 1. In the illustrated example, the streaming server 201 includes a source 202, a plurality of transraters 204a-204b, a plurality of send buffers 206a-206b, and a feedback receiver 208. Similarly, the destination 211 may include one or more processing systems 114 as illustrated in FIG. 1. In the illustrated example, the destination 211 includes a plurality of receiver buffers 212a-212b, an aggregator 214, and a feedback sender 216.

The source 202 may be a node configured for storing and/or sending data to multiple paths for a common traffic session. In the illustration, two paths are illustrated, although any suitable number of paths may be utilized. In some aspects, the source may include a storage space such as a memory, a hard drive, etc., for storing content, e.g., multimedia content. The stored multimedia content may or may not be encoded, depending on a particular implementation. The source 202 may include an encoder (not illustrated) for encoding the content as it is received at the source 202. In some aspects of the disclosure, an encoder may be a separate element, such that content may be encoded offline and encoded content may be stored in the source 202. In another aspect of the disclosure, the transrater 204 may include the encoder such that encoding of content provided by the source 202 may be performed in real time. In other aspects of the disclosure, the source may be a content generation or capture mechanism such as a camera, microphone, a network interface, etc.

Transraters 204 may be nodes configured to soft code the multimedia content, to determine how much compression is to be used, to select a coding format, and to provide information to sender buffers 206. Here, each transrater 204 receives multimedia content from the content source 202. Further, each transrater 204 receives adjustment information from a feedback receiver 208. The adjustment information provided to the transrater 204 may include error handling information, coding rate adjustment information, and resynchronization information determined in accordance with feedback information received from the destination 211. The transrater 204 may be enabled to vary error handling routines within a source coding procedure in accordance with the error handling information. The transrater 204 may further be enabled to vary the coding rate for encoding the media content in accordance with the coding rate adjustment information. Further, the transrater 204 may be enabled to adjust a timing of the media content for synchronization in accordance with the resynchronization information. These adjustments are discussed in additional detail below.

Send buffers 206 may include a memory for temporarily storing the encoded multimedia content provided by the respective transrater 204, and may further include a communication interface for transmitting the buffered multimedia content to a network, such as the Internet 210. For example, the buffer 206 may include or be communicatively coupled to a modem, an Ethernet interface, a wireless transmitter for utilizing a wireless air interface, or any other suitable means for providing information to the Internet 210. The send buffers 206 may further receive adjustment information from the feedback receiver 208, determined in accordance with the feedback information received from the destination 211. For example, the send buffer 206 may be enabled to vary a transmission rate in accordance with transmission rate adjustment information from the feedback receiver. 208.

Feedback receiver 208 may be a node that includes a rate adaptation module for running one or more adaptation algorithms, and generating the adjustment signals in accordance with the feedback information from the destination 211. For example, the feedback receiver 208 may receive the feedback information and determine that a particular parameter of transmission from the streaming server 201 could be adjusted. Thus, the feedback receiver may provide adjustment information to one or more of the transraters 204 and/or the send buffers 206 in accordance with the feedback information. The adjustment information may include coding rate adjustment information, synchronization information, transmission rate adjustment information, and error handling information.

The coding rate adjustment information may be provided to an encoder, whether the encoder is located in the source 202, in the transrater 204, or as a separate entity. In the illustrated example, the encoder (not illustrated) is located within the transraters 204 for real-time encoding, so the coding rate adjustment information is provided to the transraters 204. In another example, if the media content is encoded offline and stored at the source 202 in an encoded form, then changing the compression or coding rate based on feedback information may not be an option. In such an example, the coding rate adjustment information may not be provided.

The synchronization information may be utilized to indicate an amount of throttling or seeking forward a particular transrater 204 may implement in order to synchronize the multiple paths. That is, when an adaptation of one or more of the paths in response to the feedback information may cause the paths to come out of synchronization, the synchronization information may be utilized for throttling or seeking forward one or more of the paths to compensate and bring the paths into synchronization. Here, throttling of a transrater may generally refer to temporarily pausing the sending of data on that path. Further, seeking forward for a transrater may generally refer to skipping over some of the data that may have already been encoded, essentially fast forwarding to another section and starting to send the data from that section.

The error handling information may be utilized for adjustments to an error handling routine. The error handling routine is a part of source coding, which is known to those having ordinary skill in the art and is therefore not discussed in detail in the present disclosure.

The transmission rate adjustment information may be utilized at the send buffer 206 in order to control the rate of transmission of the buffered media content from the send buffer 206 to the Internet 210. That is, in some aspects of the disclosure in which real-time encoding is not utilized, the transmission rate from the send buffer 206 may be adjusted. In some aspects of the disclosure, the transmission rate adjustment information may not be utilized.

The Internet "cloud" 210 is one example illustrating a network for carrying the transmitted content information from the source 201 to the destination 211. Any suitable communication medium may be utilized between the source 201 and the destination 211.

At the destination 211, receiver buffers 212 may receive the media content information from the Internet 210. The receiver buffers 212 may include a memory for temporarily storing the received multimedia content provided from the streaming server 201, and may further include a communication interface for communicatively coupling the receiver buffers 212 to the Internet 210. For example, the buffer 212 may include or be communicatively coupled to a modem, an Ethernet interface, a wireless receiver for utilizing a wireless air interface, or any other suitable means for receiving information from the Internet 210. The receiver buffers 212 may further provide the buffered content to an aggregator 214.

The aggregator 214 may be a node that aggregates data from multiple paths for a common traffic session. For example, the aggregator may receive descriptions of the content from the paths including the receive buffers 212, decode the encoded descriptions, and combine the decoded descriptions to generate output content. In addition, the aggregator 214 may collect statistics corresponding to the multiple paths and determine one or more metrics for characterizing the multiple paths, and, in conjunction with the feedback sender 216, may determine and generate feedback information to be sent to the streaming server 201.

In accordance with various aspects of the disclosure, a number of system parameters may be utilized at the streaming server 201 for rate adaptation.

A rate adaptation interval, denoted as $T_{RA}$, may represent the minimum time interval over which the rate adaptation can take place. In some aspects of the disclosure, $T_{RA}$ may be about 0.5 seconds. The value of $T_{RA}$ may only be known to the streaming server 201. An initial coding rate of the $i^{th}$ path among the plurality of paths, denoted as $R_I(i)$, may represent the starting point of the coding rate at the source of the $i^{th}$ path. The value of $R_I(i)$ may be known to both the streaming server 201 and the destination 211.

The streaming server 201 may include certain timers, such as an adaptation timer corresponding to each adjustment or adaptation. These timers may utilize certain system parameters. For example, an expiration time $TO_{sync}$ of an adaptation timer for synchronization adjustment may be utilized to ensure that, before the adaptation timer for synchronization times out, no synchronization operation should take place. An expiration time $TO_{rate}$ of the adaptation timer for rate adjustment may be utilized to ensure that, before the adaptation timer for rate adjustment times out, no rate adjustment operation should take place. An expiration time $TO_{cal}$ of a calibrating timer may be utilized to ensure that, before the calibration timer times out, no calibration operation should take place.

The streaming server 201 may further monitor buffer occupancy of each of the respective send buffers 206. The buffer occupancies may utilize certain parameters. A buffer occupancy lower bound $B_L$ may be utilized to indicate a lower bound of the respective send buffer 206 occupancy for every path in time at the aggregator. In some aspects of the disclosure, $B_L$ may be about three seconds. The destination 211 may signal the streaming server 201 when the buffer occupancy drops below $B_L$. A buffer occupancy upper bound $B_U$ may be utilized to indicate a upper bound of the buffer occupancy of every path in time at the aggregator. In some aspects of the disclosure, $B_U$ may be about six seconds. The destination 211 may signal the streaming server 201 when the buffer occupancy exceeds $B_U$. An initial buffer occupancy $B_I$ may be utilized to indicate an expected buffer occupancy in time of every path. In some aspects of the disclosure, $B_I$ may be about 9 seconds. The destination 211 may signal the streaming server 201 when the buffer occupancy reaches $B_I$ for the first time. A buffer difference window W may be utilized to indicate a window for differences in buffer occupancy for a particular path with respect to an average buffer occupancy among multiple paths. The destination 211 may signal the streaming server 201 whether the buffer occupancy of a particular path falls within the window W of the reference buffer occupancy of all paths. In some aspects of the disclosure, W may be about one second.

A packet loss threshold $PLR_{th}$ may be utilized to indicate a threshold for a packet loss ratio for every path at the destination 211. In some aspects of the disclosure, $PLR_{th}$ may be approximately 0.01.

The streaming server 201 may further monitor packet transit delays. A calibrated delay of the $i^{th}$ path $D_{cal}(i)$ may be utilized to represent a calibrated delay, which may be used for determining whether a rate adjustment is necessary. The value of $D_{cal}(i)$ may be updated over time based on traffic performance. A calibrated delay lower bound for the $i^{th}$ path $D_{cal}^L(i)$ may be utilized to indicate a lower bound for a range of the calibrated delay for the $i^{th}$ path. The value of $D_{cal}^L(i)$ may be updated over time based on traffic performance. A calibrated delay upper bound of the ith path $D_{cal}^U(i)$ may be utilized to indicate an upper bound for a range of the calibrated delay of the $i^{th}$ path. The value of $D_{cal}^U(i)$ may be updated over time based on traffic performance. A calibrating delay of the $i^{th}$ path $D_{ins}(i)$ may represent a low-pass-filtered instantaneous delay measure, which may be used for tracking the instantaneous delay and also used for setting the expiration times of the adaptation timers. The value of $D_{ins}(i)$ may be updated over time based on traffic performance. A calibrating delay lower bound of the $i^{th}$ path $D_{ins}^L(i)$ may represent a lower bound of the calibrating delay range of the $i^{th}$ path. A calibrating delay upper bound of the $i^{th}$ path $D_{ins}^U(i)$ may represent upper bound of the calibrating delay range of the $i^{th}$ path. The value of $D_{ins}^U(i)$ may be updated over time based on traffic performance.

A delay jitter threshold of the $i^{th}$ path $J_{th}(i)$ may represent a threshold of the jitter of the $i^{th}$ path. The value of $J_{th}(i)$ may be updated over time based on traffic performance.

The streaming server 201 may further include parameters corresponding to the sending rate itself. A sending rate of the $i^{th}$ path $R_S(i)$ may represent the current sending data rate. A rate lower bound of the $i^{th}$ path $R_L(i)$ may be determined in accordance with the equation $R_L(i)=R_S(i)-\epsilon_R^L$. A rate upper bound of the $i^{th}$ path $R_U(i)$ may be determined in accordance with the equation $R_U(i)=R_S(i)+\epsilon_R^U$. Here, $\epsilon_R^L$ and $\epsilon_R^U$ respectively represent the span of a window for the sending rate of the $i^{th}$ path, relative to the sending rate of the $i^{th}$ path $R_S(i)$. In some aspects of the disclosure, $\epsilon_R^L$ may be much larger than $\epsilon_R^U$, e.g., by being about ten times the value of $\epsilon_R^U$.

An instructed sending rate $R_{out}(i)$ may represent the sending data rate instructed by the rate adaptation module.

In accordance with various aspects of the disclosure, a number of traffic performance variables may be determined at the destination 211, to be utilized as feedback information and thereby utilized as input variables for a rate adaptation algorithm. That is, a state of the variables may be reported as feedback information from the destination 211 to the streaming server 201 for rate adaptation decisions.

For example, a buffer level code may be utilized to indicate a level at each of the respective receive buffers 212. A buffer level code of "normal," "underflow," or "overflow" may be utilized for one or more of coding rate adjustment, transmission rate adjustment, or synchronization. Further, a buffer level code of "initial buffer reached" may be utilized for calibration purposes. A buffer difference code may be utilized to indicate differences in buffer levels between the plurality of receive buffers. A buffer difference code of "normal," "below window," or "above window" may be utilized for one or more of coding rate adjustment, transmission rate adjustment, or synchronization. That is, a window may be utilized to determine whether, compared to a reference buffer size (calculated by the destination 211), the buffer size in a particular path differs from that reference buffer size by a threshold. If the buffer size for that particular path is less than the threshold, the buffer difference code may be "below window." If the buffer size for that particular path is greater than the threshold, the buffer difference code may be "above window."

Further, a time interval of a most significant packet loss burst may be utilized as a traffic performance variable to be provided as a portion of the feedback information. The time interval may be represented as $[TB_s(i), TB_p(i)]$. Here, $TB_s(i)$ may represent the time at which the burst started, and $TB_p(i)$ may represent the time at which the burst ended. This information may be utilized by the streaming server 201 for an error handling mechanism within a source coding algorithm.

Further, certain variables may be determined for use in the coding rate adjustment. For example, a packet loss ratio $PLR(i)$, a delay $D(i)$, a delay jitter $J(i)$, and a receiving data rate $R_r(i)$.

Figure 3:
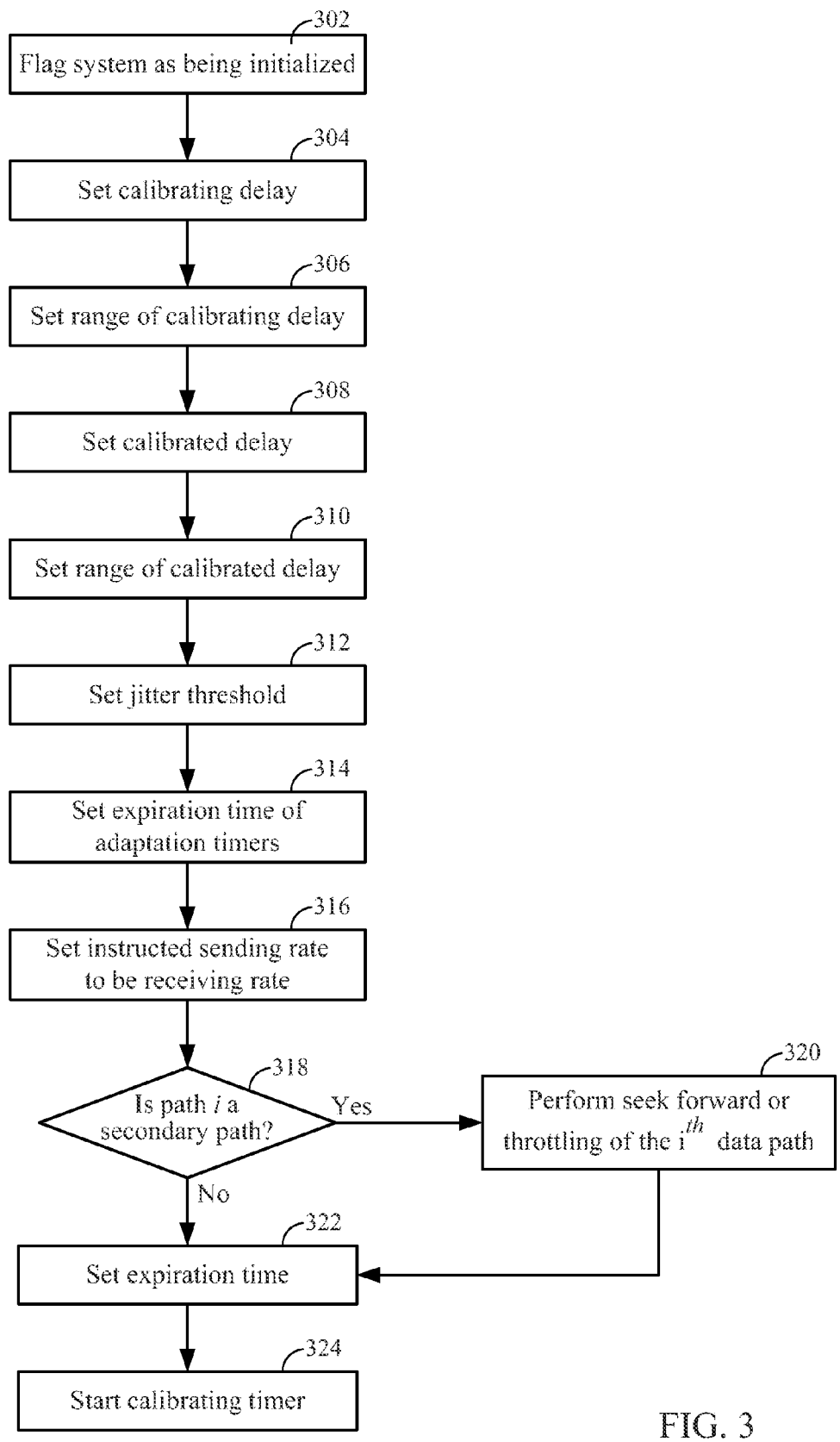
FIG. 3 is a flow chart illustrating a process for calibration for an $i^{th}$ path.

In accordance with some aspects of the disclosure, when the destination 211 reports that the initial buffer level is just reached, e.g., by sending a buffer level code of "initial buffer reached," the streaming server 201 may perform a calibration operation. FIG. 3 is a flow chart illustrating a process for calibration for an $i^{th}$ path in accordance with some aspects of the present disclosure. In block 302, the calibration process flags the system as initialized. In block 304, the process sets the calibrating delay $D_{ins}(i)$ for the $i^{th}$ path as $D_{ins}(i)=D(i)$. In block 306, the process sets the range $[D_{ins}^L, D_{ins}^U]$ for the calibrating delay for the $i^{th}$ path as $D_{ins}^L(i)=\rho_{ins}^L D_{ins}^L(i)$, and $D_{ins}^U(i)=\rho_{ins}^U D_{ins}^L(i)$. Here, $\rho_{ins}^L$ and $\rho_{ins}^U$ are constants that may be equal to about ⅘ and ⁶⁄₅, respectively.

In block 308, the process sets the calibrated delay $D_{cal}(i)$ for the $i^{th}$ path as $D_{cal}(i)=D(i)$. In block 310, the process sets the range $[D_{cal}^L, D_{cal}^U]$ for the calibrated delay for the $i^{th}$ path as $D_{cal}^L(i)=\rho_{cal}^L D_{cal}^L(i)$, and $D_{cal}^U(i)=\rho_{cal}^U D_{cal}^L(i)$. Here, $\rho_{cal}^L$ and $\rho_{cal}^U$ are constants that may be equal to about ⅘ and ⁴⁄₃, respectively. In block 312, the process sets the jitter threshold for the $i^{th}$ path as $J_{th}(i)=\rho_J D_{cal}(i)$. Here, $\rho_J$ is a constant that may be equal to about ½. In block 314, the process sets the expiration time of the adaptation timers as $TO_{sync}=D(i)$, and $TO_{rate}=D(i)$. In block 316, the process sets the instructed sending rate $R_{out}(i)$ to be the receiving rate $R_r(i)$.

In block 318, the process may check whether path i is a secondary path or a primary path. Here, the first established path from the streaming server 201 to the destination 211 may be referred to as a primary path, and data paths established after the primary path are each called secondary paths. If path i is a secondary path, then in block 320, the process may perform one of a seek forward operation or a throttling operation of the data path based on the delay difference $D(i)-D(0)$, in order to synchronize the respective data paths. In block 320, the process sets the expiration time as $TO_{cal}=N_{stable} \cdot 2D_{cal}(i)$. Here, $N_{stable}$ is a constant that may be equal to about 5. In block 324, the process begins the calibrating timer, completing the calibration process.

Figure 4:
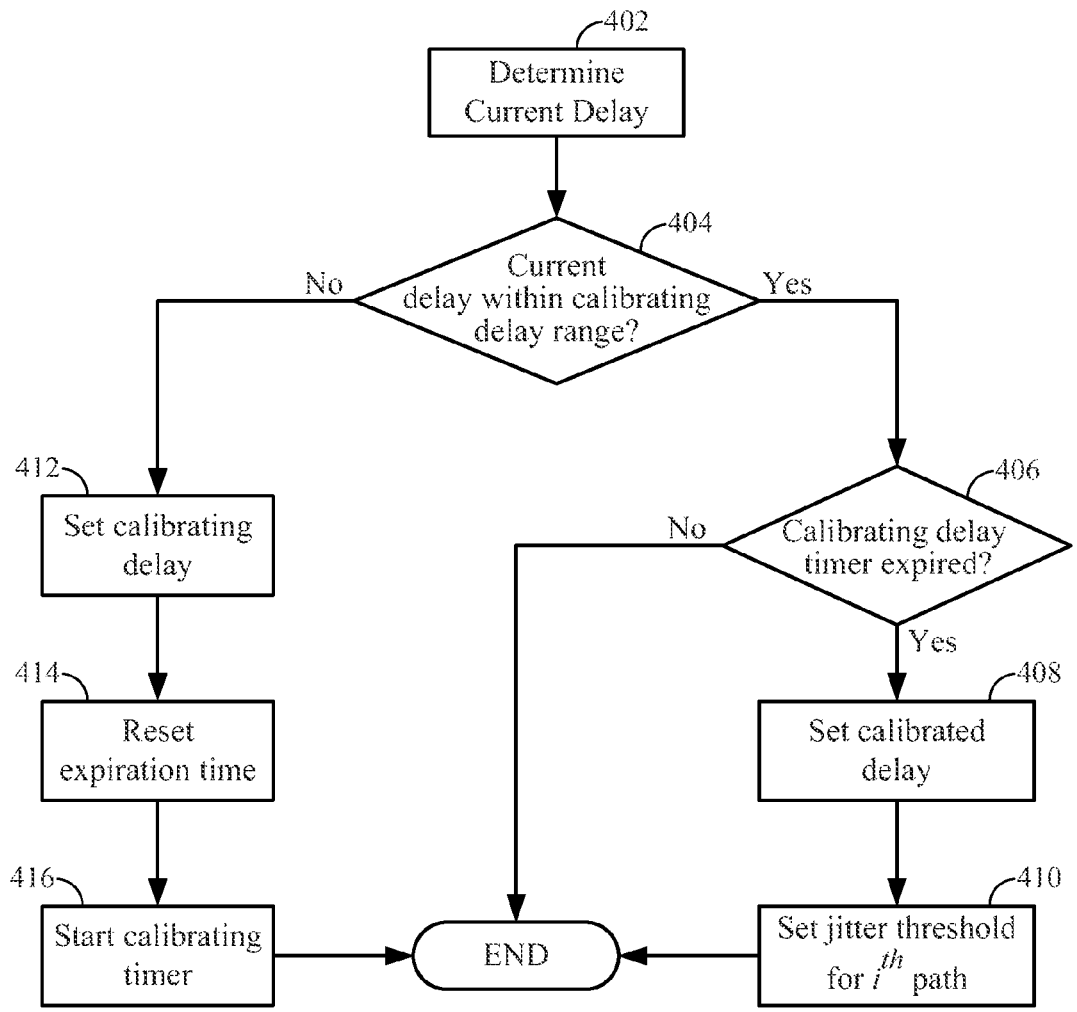
FIG. 4 is a flow chart illustrating a delay calibration.
Figure 5A:
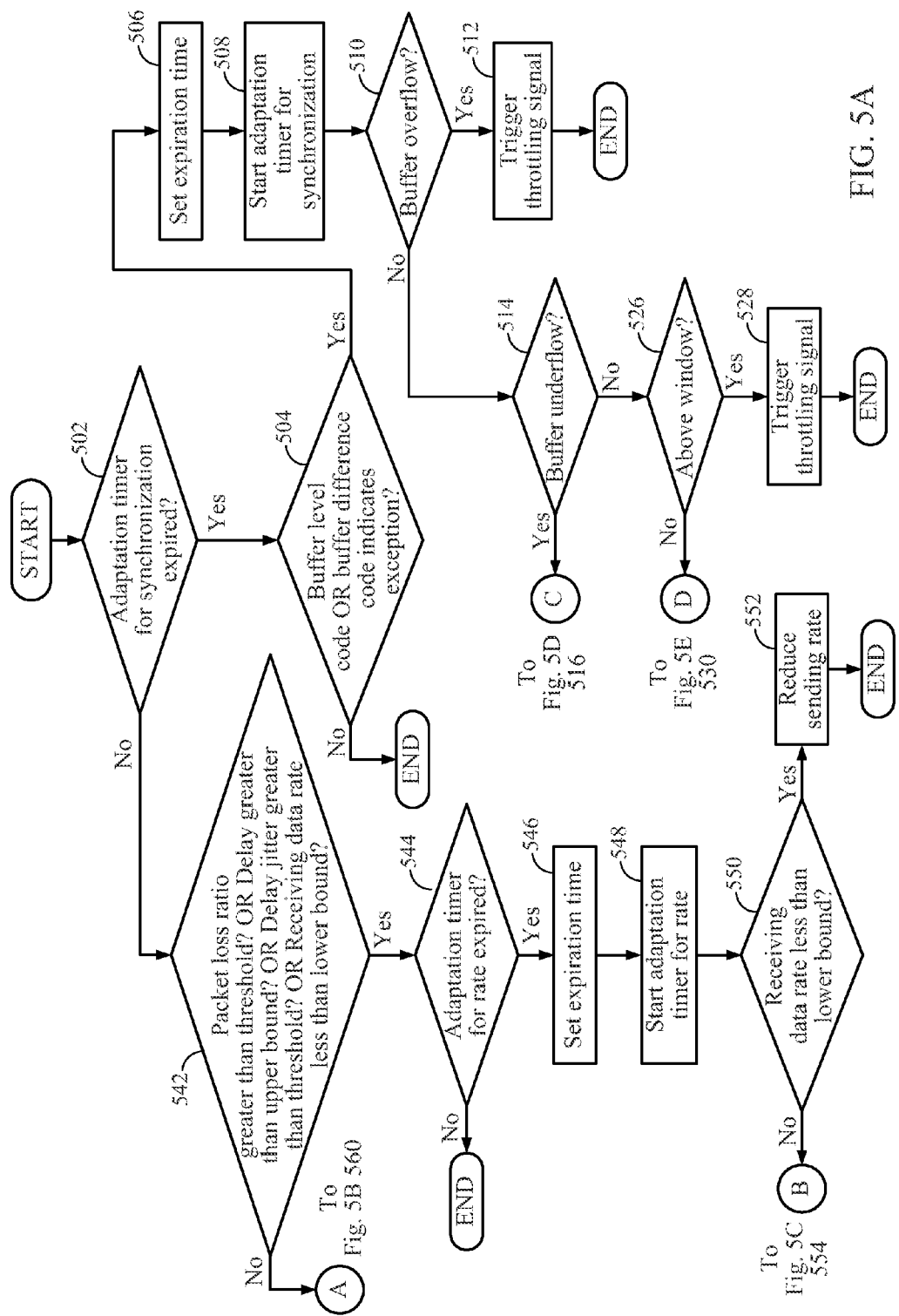
FIG. 5 is a flow chart illustrating a process for synchronization among a plurality of paths.
Figure 5B:
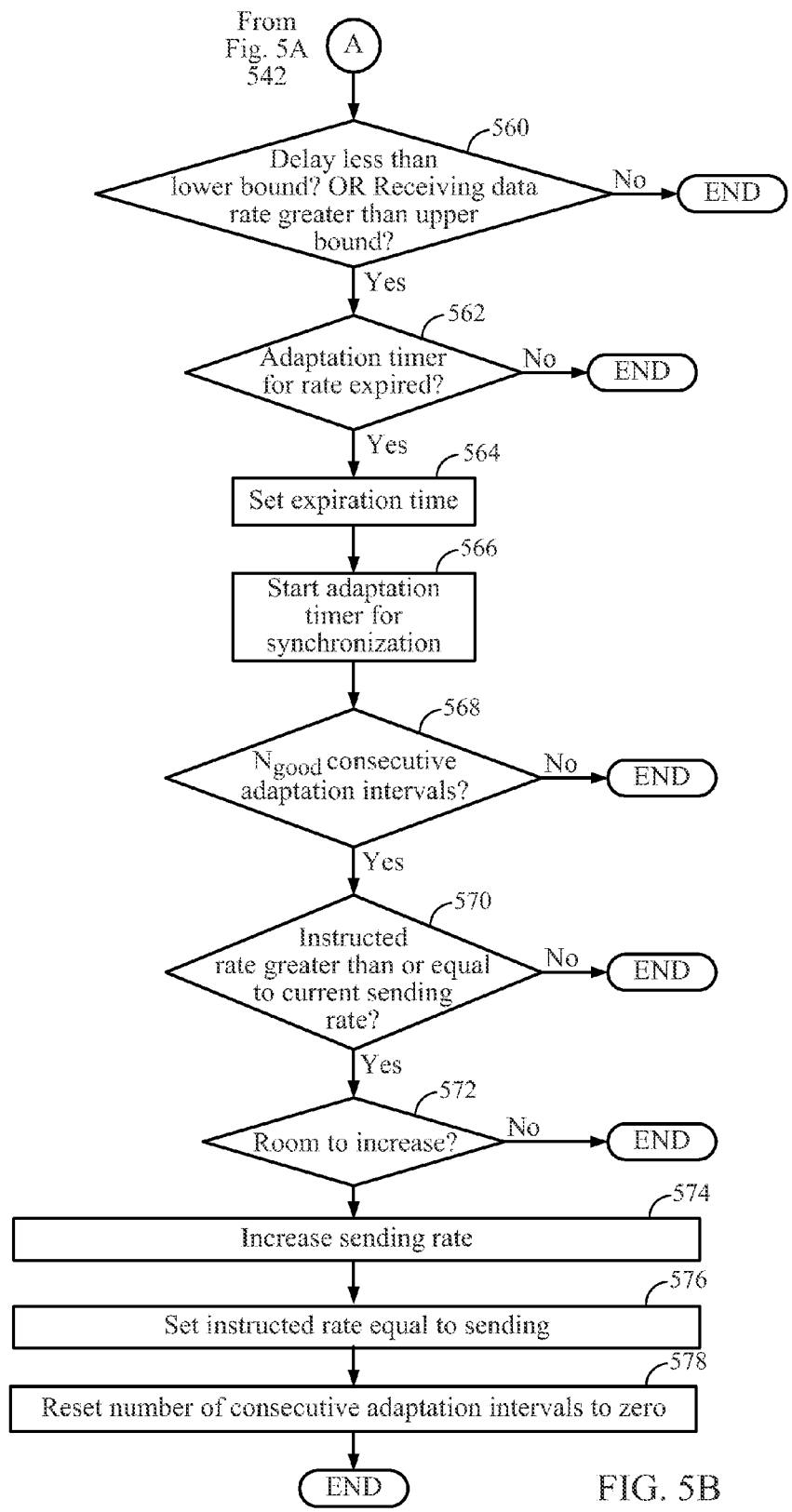
Figure 5C:
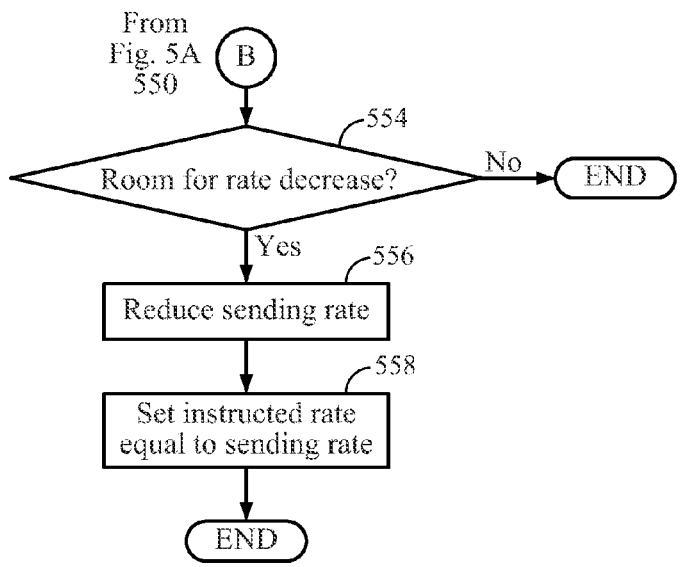
Figure 5D:
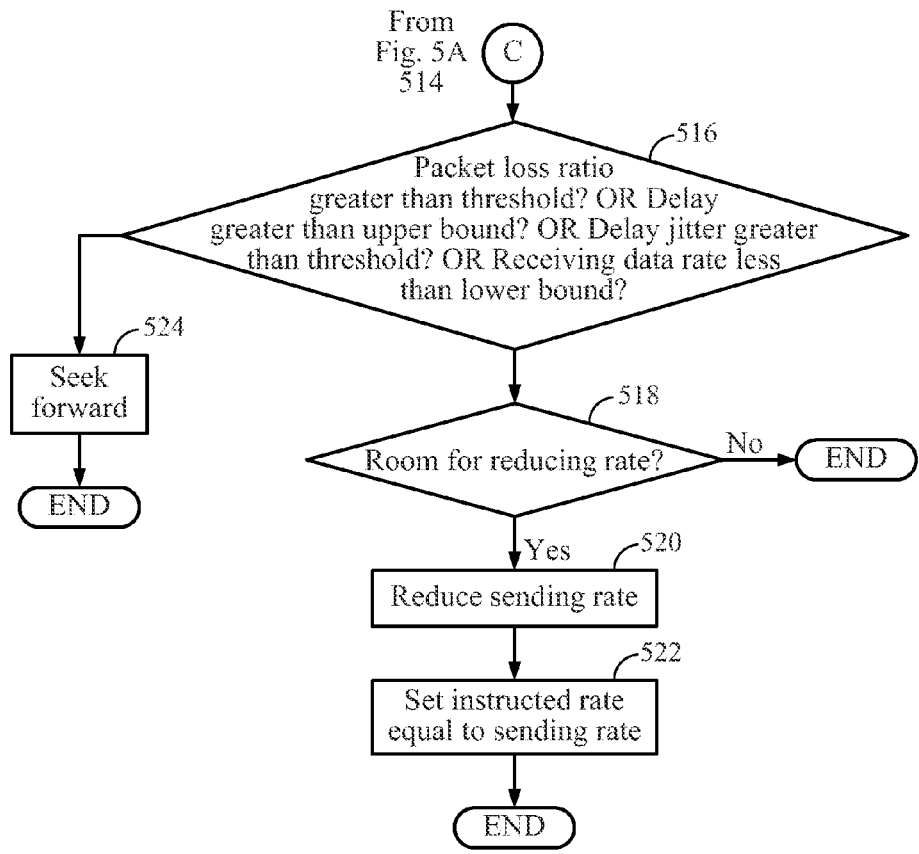
Figure 5E:
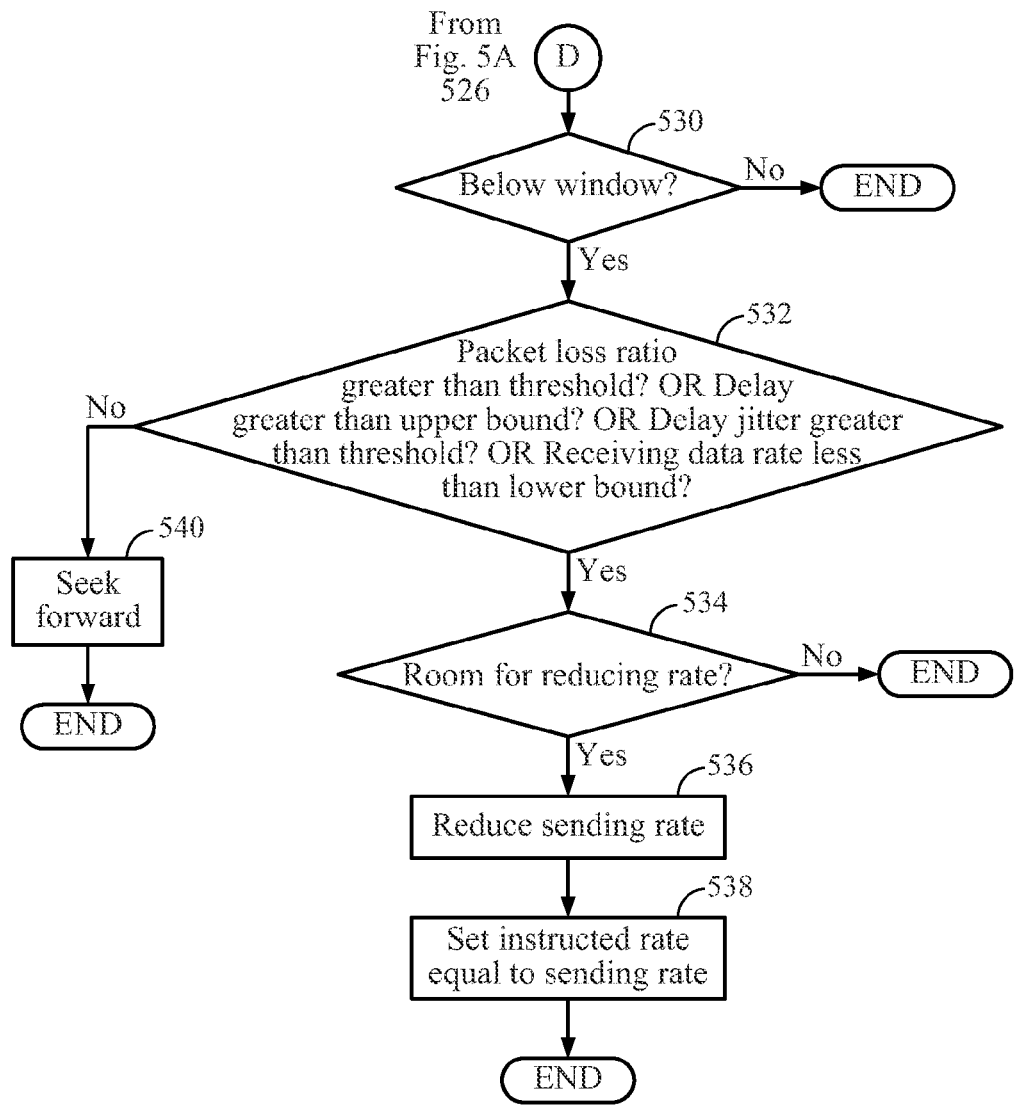

FIG. 4 is a flow chart illustrating a delay calibration in accordance with a further aspect of the disclosure. Here, in block 402, the process may determine the current delay for the $i^{th}$ path $D(i)$. In block 404, the process may determine whether the current delay $D(i)$ is within the calibrating delay range. That is, whether $D_{ins}^L(i) \leq D(i) \leq D_{ins}^U(i)$. If within the calibrating delay range, then in block 406, the process may determine whether a calibrating delay timer has expired. If the calibrating delay timer has expired, then in block 408, the process may set the calibrated delay as $D_{cal}(i)=D_{ins}(i)$; $D_{cal}^L(i)=\rho_{cal}^L D_{cal}(i)$; and $D_{cal}^U(i)=\rho_{cal}^U D_{cal}(i)$. Next, in block 410, the process may set the jitter threshold for the $i^{th}$ path as $J_{th}(i)=\rho_J D_{cal}(i)$.

If, in block 404, the process determines that the current delay $D(i)$ is not within the calibrating delay range, then in block 412, the process may set the calibrating delay as $D_{ins}(i)=D(i)$; $D_{ins}^L(i)=\rho_{ins}^L D_{ins}(i)$; and $D_{ins}^U(i)=\rho_{ins}^U D_{ins}(i)$. Next, in block 414, the process may reset the expiration time as $TO_{cal}=N_{stable} \cdot 2D_{cal}(i)$; and in block 416, the process may start the calibrating timer.

FIG. 5 is a flow chart illustrating a process for synchronization among a plurality of paths. In block 502, the process determines whether the adaptation timer for synchronization has expired (i.e., has reached $TO_{sync}$). If expired, then in block 504, the process determines whether one or both of the buffer level code or the buffer difference code indicates an exception. For example, a buffer level code of "overflow" or "underflow" may indicate an exception; and a buffer difference code of "below window" or "above window" may indicate an exception. If there is an exception, then in block 506, the process may set the expiration time as $TO_{sync}=2D_{ins}(i)$, and in block 508, the process may start the adaptation timer for synchronization.

In block 510, the process determines whether the exception was that the buffer level code was "overflow." If yes, then in block 512, the process may trigger a throttling signal for throttling the transrater 204 corresponding to the path. If no, then in block 514, the process determines whether the exception was that the buffer level code was "underflow." If yes, then in block 516, the process determines whether it should increase or reduce the sending rate. The sending rate may be reduced if any one of the following is true. That is, if the packet loss ratio for the $i^{th}$ path PLR(i) is greater than the packet loss threshold $PLR_{th}$ (i.e., if PLR(i)>$PLR_{th}$); or if the delay for the $i^{th}$ path D(i) is greater than the calibrated delay upper bound of the $i^{th}$ path $D_{cal}^U$ (i.e., if D(i)>$D_{cal}^U$(i)); or if the delay jitter for the $i^{th}$ path J(i) is greater than the jitter threshold for the $i^{th}$ path $J_{th}(i)$ (i.e., if J(i)>$J_{th}(i)$); or if the receiving data rate for the $i^{th}$ path $R_r(i)$ is less than the rate lower bound of the $i^{th}$ path $R_L(i)$ (i.e., if $R_r(i)$<$R_L(i)$). If any one of these conditions is true, then in block 518, the process may determine whether there is room for reducing the sending rate of the $i^{th}$ path $R_S(i)$. If there is room, then in block 520, the process may reduce the sending rate of the $i^{th}$ path $R_S(i)$, e.g., by two levels; and in block 522, the process may set the instructed rate of the $i^{th}$ path $R_s(i)$ to be the reduced sending rate as set in block 520. If none of the conditions determined in block 516 are true, then in block 524, the process may seek forward the transrater 204 corresponding to the $i^{th}$ path, e.g., by an amount equal to a difference between the initial buffer occupancy $B_I$ and the buffer occupancy lower bound $B_L$, i.e., ($B_I$-$B_L$).

If, on the other hand, the exception determined in block 504 was that the buffer difference code was "above window," as shown in block 526, then in block 528, the process may trigger the throttling signal for throttling the transrater 204 corresponding to the $i^{th}$ path.

If, on the other hand, the exception determined in block 504 was that the buffer difference code was "below window," as shown in block 530, then in block 532, the process may determine whether it should increase or reduce the sending rate. The sending rate may be reduced if any one of the following is true. That is, if the packet loss ratio for the $i^{th}$ path PLR(i) is greater than the packet loss threshold $PLR_{th}$ (i.e., if PLR(i)>$PLR_{th}$); or if the delay for the $i^{th}$ path D(i) is greater than the calibrated delay upper bound of the $i^{th}$ path $D_{cal}^U(i)$ (i.e., if D(i)>$D_{cal}^U(i)$); or if the delay jitter for the $i^{th}$ path J(i) is greater than the jitter threshold for the $i^{th}$ path $J_{th}(i)$ (i.e., if J(i)>$J_{th}(i)$); or if the receiving data rate for the $i^{th}$ path $R_r(i)$ is less than the rate lower bound of the $i^{th}$ path $R_L(i)$ (i.e., if $R_r(i)$<$R_L(i)$). If any one of these conditions is true, then in block 534, the process may determine whether there is room for reducing the sending rate of the $i^{th}$ path $R_S(i)$. If there is room, then in block 520, the process may reduce the sending rate of the $i^{th}$ path $R_S(i)$, e.g., by one level; and in block 536, the process may set the instructed rate of the $i^{th}$ path $R_s(i)$ to be the reduced sending rate as set in block 536. If none of the conditions determined in block 532 are true, then in block 540, the process may seek forward the transrater 204 corresponding to the $i^{th}$ path, e.g., by an amount equal to half of the buffer difference window W (i.e., W/2).

If, in block 502, it is determined that the adaptation timer for synchronization has not expired, then in block 542, the process may determine whether it should increase or reduce the sending rate. The sending rate may be reduced if any one of the following is true. That is, if the packet loss ratio for the $i^{th}$ path PLR(i) is greater than the packet loss threshold $PLR_{th}$ (i.e., if PLR(i)>$PLR_{th}$); or if the delay for the $i^{th}$ path D(i) is greater than the calibrated delay upper bound of the $i^{th}$ path $D_{cal}^U(i)$ (i.e., if D(i)>$D_{cal}^U(i)$); or if the delay jitter for the $i^{th}$ path J(i) is greater than the jitter threshold for the $i^{th}$ path $J_{th}(i)$ (i.e., if J(i)>$J_{th}(i)$); or if the receiving data rate for the $i^{th}$ path $R_r(i)$ is less than the rate lower bound of the $i^{th}$ path $R_L(i)$ (i.e., if $R_r(i)$<$R_L(i)$). If any one of these conditions is true, then in block 544, the process may determine whether the adaptation timer for rate has expired (e.g., if the adaptation timer for rate has reached the expiration time $TO_{rate}$). If the adaptation timer for rate has expired, then in block 546, the process may set the expiration time as $TO_{rate}=2D_{ins}(i)$; and in block 548, the process may start the adaptation timer for rate. Next, in block 550, the process may determine whether the receiving data rate for the $i^{th}$ path $R_r(i)$ is less than the rate lower bound of the $i^{th}$ path $R_L(i)$. If $R_r(i)$<$R_L(i)$, then in block 552, the process may reduce the sending rate for the $i^{th}$ path such that $R_s(i)=R_r(i)$. Otherwise, if as determined in block 550, $R_r(i) \geq R_L(i)$, then in block 554, the process may determine whether there is room for a reduction in the sending rate for the $i^{th}$ path $R_S(i)$. If there is room, then in block 556, the process may reduce the sending rate for the $i^{th}$ path $R_S(i)$ by one level, and in block 558, the process may set the instructed rate for the $i^{th}$ path $R_s(i)$ to be the reduced sending rate determined in block 556.

If none of the conditions determined in block 542 are true, then in block 560, the process may determine whether it should increase the sending rate. The sending rate may be increased if either of the following is true. That is, if the delay for the $i^{th}$ path D(i) is less than the calibrated delay lower bound for the $i^{th}$ path $D_{cal}^L(i)$; or if the receiving data rate for the $i^{th}$ path $R_r(i)$ is less than the rate lower bound of the $i^{th}$ path $R_L(i)$. If either of these conditions is true, then in block 562, the process may determine whether the adaptation timer for rate has expired, e.g., if the adaptation timer for rate has reached $TO_{rate}$. If yes, then block 564, the process may set the expiration time as $TO_{rate}=2D_{ins}(i)$; and in block 566, the process may start the adaptation timer for rate. Next, in block 568, the process may determine whether the system has consecutively entered this state for $N_{good}$ adaptation intervals. In some aspects of the disclosure, $N_{good}$ may be about 3. If yes, then in block 570, the process may determine whether the instructed rate of the $i^{th}$ path $R_s(i)$ is greater than or equal to the current sending rate of the $i^{th}$ path $R_S(i)$. If yes, then in block 572, the process may determine whether there is room to increase the sending rate of the $i^{th}$ path $R_S(i)$ in the codec. If yes, then in block 574, the process may increase the sending rate by one level; in block 576, the process may set the instructed rate for the $i^{th}$ path $R_S(i)$ to be the increased sending rate determined in block 574; and in block 578, the process may reset the number of consecutive adaptation intervals in this state to zero.

In accordance with some aspects of the disclosure, the streaming server 201 may perform error handling in accordance with certain parameters including a packet loss ratio PLR(i), a starting time of a packet loss burst $TB_s(i)$, and a stopping time of a packet loss burst $TB_p(i)$. The error handling procedure may be a part of a source coding procedure, which may depend, in part, on certain parameters including PLR(i), $TB_s(i)$, $TB_p(i)$, a coding rate C(i) adjusted by a rate adaptation module, and a delay jitter JO. Because source coding is known to those having ordinary skill in the art, it is not discussed in further detail in the present disclosure.

Thus, in accordance with various aspects of the present disclosure, rate adaptation may be implemented in a disjoint manner, that is, essentially independently on each of a plurality of paths, while maintaining synchronicity between the multiple paths. This can be accomplished by implementing a synchronization operation that interplays with the rate adjustments.

When a data rate is adjusted on a given path, the adjustment is typically intended to match the data rate to the quality of that path. For example, when channel conditions are poor or capacity is low, a data rate may be reduced, and when channel conditions are excellent or capacity is high, a data rate may be increased. However, when the data rate on one out of multiple paths is independently adjusted, a loss of synchronicity may occur. Thus, in accordance with some aspects of the present disclosure, the feedback mechanism, including the feedback sender 216, feedback receiver 208, and corresponding signals, can be utilized to monitor and determine differences among receive buffers 212, to determine whether data rates are within expectations, or any other conditions that may merit adjustments at the sender 201 to maintain synchronization.

Under certain conditions, a synchronization operation may be utilized, wherein one or more transraters 204 may be instructed to throttle or seek forward their transmission. Under certain other conditions, a data rate adjustment may be made for one or more of the send buffers 206 rather than the synchronization operation, even if the paths are out of sync at that time. In any case, conjunctive adjustments may be made for each of the paths to maintain synchronization while adjusting the data rates of each of the data paths independently based on conditions for each respective path.

In accordance with some aspects of the disclosure, a testing period may be utilized before data is streamed from the streaming server 201 to the destination 211. In the testing period, one or more short traffic bursts can be sent out to test each sending rate level. The streaming server 201 may then look at the feedback corresponding to the receiving rate. In an aspect of the present disclosure, the initial coding rate $R_1$ can be set as $R_I(i) = \frac{1}{2} \cdot \max_{\forall R_r(i)} [R_r(i)]$.

In this fashion, by utilizing the testing period, a scene change in multimedia content can easily be accommodated. In a scene change during streaming of multimedia content, the amount of traffic to be played in a particular time slot may be much different than the amount of traffic to be played in a consecutive time slot. For example, if a first scene only utilizes a very small amount of traffic, the feedback information provided from the destination 211 to the streaming server 201 may not be useful in determining how much more traffic the network can accommodate if the scene were to change to require a large amount of traffic. Thus, utilizing the above-described testing procedure, one or more short traffic bursts can be sent out on one or more of the paths, to test the respective paths. When the corresponding feedback information is received, the streaming server 201 will better be able to determine a transmission rate for each of the paths immediately upon the scene change without taking the risk that one or more of the paths would be above capacity.

Figure 6:
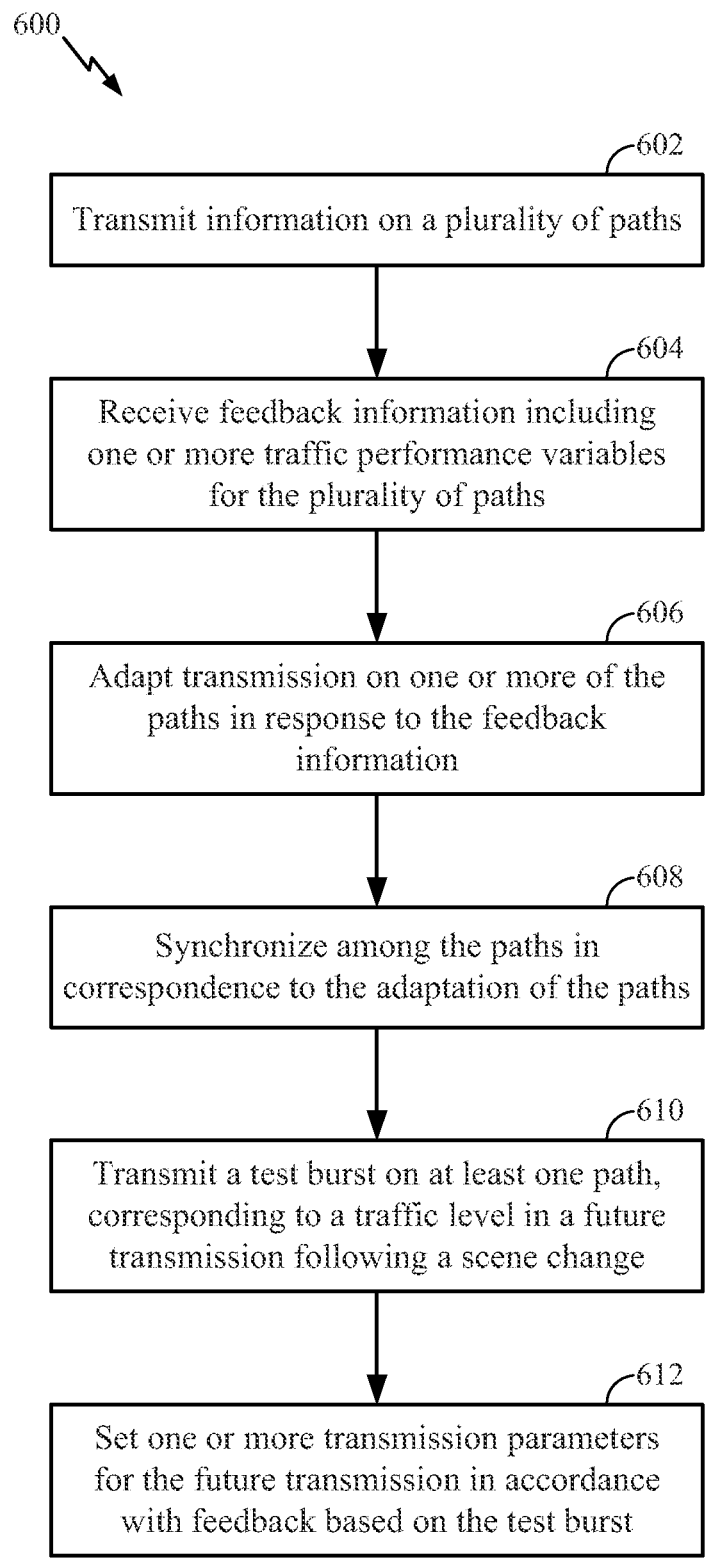
FIG. 6 is a flow chart illustrating an exemplary process 600 for multipath rate adaptation.

FIG. 6 is a flow chart illustrating an exemplary process 600 for multipath rate adaptation in accordance with some aspects of the disclosure. The process 600 may be implemented by the processing system 114 of FIG. 1, by the streaming server 201 illustrated in FIG. 2, or by any other suitable apparatus for multipath rate adaptation. In block 602, a streaming server may transmit information on a plurality of paths. In block 604, the streaming server may receive feedback information including one or more traffic performance variables for the plurality of paths. In block 606, the streaming server may adapt the transmission on one or more of the paths, in response to the feedback information received in block 604. In block 608, the streaming server may synchronize among the paths, in correspondence to the adaptation of the paths performed in block 606. In block 610, the streaming server may transmit a test burst on at least one of the plurality of paths, the test burst corresponding to a traffic level in a future transmission following a scene change. In block 612, the streaming server may set one or more of the transmission parameters for the future transmission in accordance with feedback based on the test burst.

Figure 7:
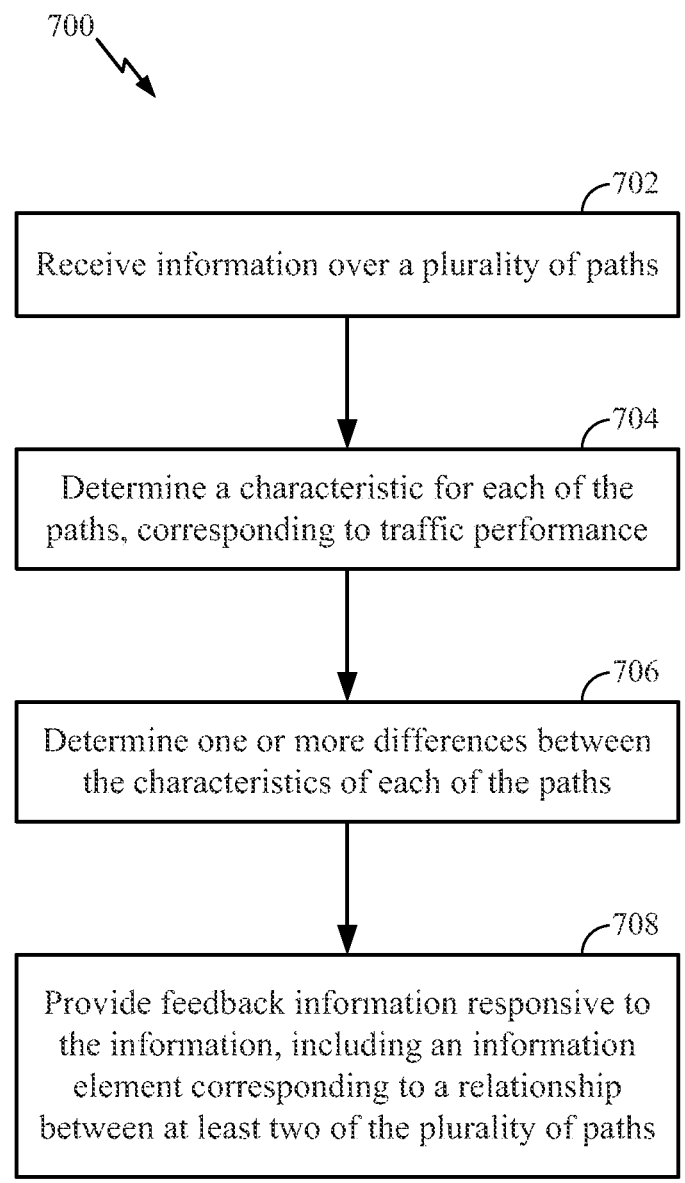
FIG. 7 is a flow chart illustrating an exemplary process 700 for providing feedback for multipath rate adaptation.

FIG. 7 is a flow chart illustrating an exemplary process 700 for providing feedback for multipath rate adaptation in accordance with some aspects of the disclosure. In block 702, a destination may receive information over a plurality of paths. In block 704, the destination may determine a characteristic for each of the paths, the characteristic corresponding to traffic performance on the respective paths. In block 706, the destination may determine one or more differences between the characteristics of each of the paths, and in block 708, the destination may provide feedback information responsive to the received information. The feedback information may include an information element corresponding to a relationship between at least two of the plurality of paths.

In one configuration, the apparatus for multipath rate adaptation may include means for transmitting information on each of a plurality of paths, means for receiving feedback information including one or more traffic performance variables for the plurality of paths, means for adapting the transmitting on one or more of the paths in response to the feedback information, means for synchronizing among the plurality of paths in correspondence to the adapting of the transmitting, means for determining an adjustment to at least one of the one or more transmission parameters in accordance with the feedback information, means for executing at least one of a throttling operation or a seeking forward operation, means for transmitting a test burst on at least one of the plurality of paths, and means for setting one or more transmission parameters for the future transmission in accordance with feedback information received based on the test burst. In one aspect, the aforementioned means may be the processing system 114 configured to perform the functions recited by the aforementioned means. In another aspect, the aforementioned means may be the source 202, the transrater 204, the source buffer, 206, and/or the feedback receiver 208. In yet another aspect, the aforementioned means may be a module or any apparatus configured to perform the functions recited by the aforementioned means.

In another configuration, the apparatus for providing feedback for multipath rate adaptation may include means for receiving information over a plurality of paths, means for providing feedback information responsive to the information, wherein the feedback information comprises an information element corresponding to a relationship between at least two of the plurality of paths, means for determining a characteristic for each of the paths, and means for determining one or more differences between the characteristics of each of the paths. In one aspect, the aforementioned means may be the processing system 114 configured to perform the functions recited by the aforementioned means. In another aspect, the aforementioned means may be the receive buffer 212, the aggregator 214, and/or the feedback sender 216 configured to perform the functions recited by the aforementioned means. In another aspect, the aforementioned means may be a module or any apparatus configured to perform the functions recited by the aforementioned means.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The invention claimed is:

1. A method operable at a wireless communication device for multipath rate adaptation, comprising:
    transmitting information on each of a plurality of paths;
    receiving feedback information comprising one or more traffic performance variables for the plurality of paths;
    adapting the transmitting on one or more of the paths in response to the feedback information; and
    synchronizing among the plurality of paths to compensate for the adapting of the transmitting.

2. The method of claim 1,
    wherein the information comprises multimedia content.

3. The method of claim 2,
    wherein the multimedia content comprises a plurality of multiple description coding-encoded descriptions of the multimedia content, each of the descriptions being transmitted on a respective one of the plurality of paths.

4. The method of claim 1,
    wherein the one or more traffic performance variables comprise:
    a buffer occupancy information element corresponding to a buffer occupancy of at least one receive buffer utilized at a destination of the transmission on one of the plurality of paths;
    a buffer difference information element corresponding to a difference in buffer occupancies between at least two of a plurality of receive buffers utilized at a destination of the transmission on respective ones of the plurality of paths;

a packet loss ratio for one of the plurality of paths;
a time interval for a most significant packet loss burst for one or more of the plurality of paths;
a packet delay for one of the plurality of paths;
a delay jitter for one of the plurality of paths; or
a receiving data rate for one of the plurality of paths.

5. The method of claim 1,
wherein the transmitting is in accordance with one or more transmission parameters, and wherein the adapting of the transmitting comprises determining an adjustment to at least one of the one or more transmission parameters in accordance with the feedback information.

6. The method of claim 5,
wherein the at least one of the one or more transmission parameters comprises:
a transmission rate for at least one of the paths; or
a coding rate for at least one of the paths.

7. The method of claim 1,
wherein the feedback information comprises error handling information for varying an error handling routine in a source coding procedure in accordance with the one or more traffic performance variables for the plurality of paths.

8. The method of claim 1,
wherein the synchronizing comprises at least one of a throttling operation or a seeking forward operation.

9. The method of claim 1,
wherein the synchronizing is responsive to the feedback information.

10. The method of claim 1,
further comprising:
transmitting a test burst on at least one of the plurality of paths, wherein the test burst corresponds to a traffic level in a future transmission of information following a scene change; and
setting one or more transmission parameters for the future transmission in accordance with feedback information received based on the test burst.

11. An apparatus for multipath rate adaptation, comprising:
means for transmitting information on each of a plurality of paths;
means for receiving feedback information comprising one or more traffic performance variables for the plurality of paths;
means for adapting the transmitting on one or more of the paths in response to the feedback information; and
means for synchronizing among the plurality of paths to compensate for the adapting of the transmitting.

12. The apparatus of claim 11, wherein the information comprises multimedia content.

13. The apparatus of claim 12,
wherein the multimedia content comprises a plurality of multiple description coding-encoded descriptions of the multimedia content, each of the descriptions being transmitted on a respective one of the plurality of paths.

14. The apparatus of claim 11,
wherein the one or more traffic performance variables comprise:
a buffer occupancy information element corresponding to a buffer occupancy of at least one receive buffer utilized at a destination of the transmission on one of the plurality of paths;
a buffer difference information element corresponding to a difference in buffer occupancies between at least two of a plurality of receive buffers utilized at a destination of the transmission on respective ones of the plurality of paths;
a packet loss ratio for one of the plurality of paths;
a time interval for a most significant packet loss burst for one or more of the plurality of paths;
a packet delay for one of the plurality of paths;
a delay jitter for one of the plurality of paths; or
a receiving data rate for one of the plurality of paths.

15. The apparatus of claim 11,
wherein the means for transmitting is configured to transmit in accordance with one or more transmission parameters, and wherein the means for adapting the transmitting comprises means for determining an adjustment to at least one of the one or more transmission parameters in accordance with the feedback information.

16. The apparatus of claim 15,
wherein the at least one of the one or more transmission parameters comprises:
a transmission rate for at least one of the paths; or
a coding rate for at least one of the paths.

17. The apparatus of claim 11,
wherein the feedback information comprises error handling information for varying an error handling routine in a source coding procedure in accordance with the one or more traffic performance variables for the plurality of paths.

18. The apparatus of claim 11,
wherein the means for synchronizing comprises means for executing at least one of a throttling operation or a seeking forward operation.

19. The apparatus of claim 11,
wherein the means for synchronizing is configured to synchronize responsive to the feedback information.

20. The apparatus of claim 11,
further comprising:
means for transmitting a test burst on at least one of the plurality of paths, wherein the test burst corresponds to a traffic level in a future transmission of information following a scene change; and
means for setting one or more transmission parameters for the future transmission in accordance with feedback information received based on the test burst.

21. A non-transitory computer-readable medium operable at a wireless communication device, comprising:
code for transmitting information on each of a plurality of paths;
code for receiving feedback information comprising one or more traffic performance variables for the plurality of paths;
code for adapting the transmitting on one or more of the paths in response to the feedback information; and
code for synchronizing among the plurality of paths to compensate for the adapting of the transmitting.

22. The non-transitory computer-readable medium of claim 21,
wherein the information comprises multimedia content.

23. The non-transitory computer-readable medium of claim 22,
wherein the multimedia content comprises a plurality of multiple description coding-encoded descriptions of the multimedia content, each of the descriptions being transmitted on a respective one of the plurality of paths.

24. The non-transitory computer-readable medium of claim 21,
wherein the one or more traffic performance variables comprise at least one of:
a buffer occupancy information element corresponding to a buffer occupancy of at least one receive buffer utilized at a destination of the transmission on one of the plurality of paths;
a buffer difference information element corresponding to a difference in buffer occupancies between at least two of a plurality of receive buffers utilized at a destination of the transmission on respective ones of the plurality of paths; a packet loss ratio for one of the plurality of paths;
a time interval for a most significant packet loss burst for one or more of the plurality of paths;
a packet delay for one of the plurality of paths;
a delay jitter for one of the plurality of paths; or
a receiving data rate for one of the plurality of paths.

25. The non-transitory computer-readable medium of claim 21,
wherein the code for transmitting is adapted to transmit in accordance with one or more transmission parameters, and wherein the code for adapting the transmitting comprises code for determining an adjustment to at least one of the one or more transmission parameters in accordance with the feedback information.

26. The non-transitory computer-readable medium of claim 25,
wherein the at least one of the one or more transmission parameters comprises:
a transmission rate for at least one of the paths; or
a coding rate for at least one of the paths.

27. The non-transitory computer-readable medium of claim 21,
wherein the feedback information comprises error handling information for varying an error handling routine in a source coding procedure in accordance with the one or more traffic performance variables for the plurality of paths.

28. The non-transitory computer-readable medium of claim 21,
wherein the code for synchronizing comprises code for executing at least one of a throttling operation or a seeking forward operation.

29. The non-transitory computer-readable medium of claim 28,
wherein the code for synchronizing is configured to synchronize responsive to the feedback information.

30. The non-transitory computer-readable medium of claim 21,
wherein the computer-readable medium further comprises:
code for transmitting a test burst on at least one of the plurality of paths, wherein the test burst corresponds to a traffic level in a future transmission of information following a scene change; and
code for setting one or more transmission parameters for the future transmission in accordance with feedback information received based on the test burst.

31. An apparatus for multipath rate adaptation, comprising:
at least one processor; and
a memory coupled to the at least one processor, wherein the at least one processor is configured to:
transmit information on each of a plurality of paths;
receive feedback information comprising one or more traffic performance variables for the plurality of paths;
adapt the transmitting on one or more of the paths in response to the feedback information; and
synchronize among the plurality of paths to compensate for the adapting of the transmitting.

32. The apparatus of claim 31,
wherein the information comprises multimedia content.

33. The apparatus of claim 32,
wherein the multimedia content comprises a plurality of multiple description coding-encoded descriptions of the multimedia content, each of the descriptions being transmitted on a respective one of the plurality of paths.

34. The apparatus of claim 31,
wherein the one or more traffic performance variables comprise:
a buffer occupancy information element corresponding to a buffer occupancy of at least one receive buffer utilized at a destination of the transmission on one of the plurality of paths;
a buffer difference information element corresponding to a difference in buffer occupancies between at least two of a plurality of receive buffers utilized at a destination of the transmission on respective ones of the plurality of paths;
a packet loss ratio for one of the plurality of paths;
a time interval for a most significant packet loss burst for one or more of the plurality of paths;
a packet delay for one of the plurality of paths;
a delay jitter for one of the plurality of paths; or
a receiving data rate for one of the plurality of paths.

35. The apparatus of claim 31,
wherein the transmitting is in accordance with one or more transmission parameters, and wherein the adapting of the transmitting comprises determining an adjustment to at least one of the one or more transmission parameters in accordance with the feedback information.

36. The apparatus of claim 35,
wherein the at least one of the one or more transmission parameters comprises:
a transmission rate for at least one of the paths; or
a coding rate for at least one of the paths.

37. The apparatus of claim 31,
wherein the feedback information comprises error handling information for varying an error handling routine in a source coding procedure in accordance with the one or more traffic performance variables for the plurality of paths.

38. The apparatus of claim 31,
wherein the synchronizing comprises at least one of a throttling operation or a seeking forward operation.

39. The apparatus of claim 31,
wherein the synchronizing is responsive to the feedback information.

40. The apparatus of claim 31,
wherein the at least one processor is further configured to:
transmit a test burst on at least one of the plurality of paths, wherein the test burst corresponds to a traffic level in a future transmission of information following a scene change; and
set one or more transmission parameters for the future transmission in accordance with feedback information received based on the test burst.

41. A method of multipath rate adaptation, comprising:
transmitting information on each of a plurality of paths;
receiving feedback information comprising one or more traffic performance variables for the plurality of paths;

adapting at least one of a transmission rate or a coding rate on one or more of the paths in response to the feedback information; and synchronizing among the plurality of paths in correspondence to the adapting of the transmission rate or coding rate, by throttling the transmitting or seeking forward the transmitting.

42. The method of claim 41, wherein the adapting at least one of a transmission rate or a coding rate on one or more of the paths comprises independently adapting each of the paths in response to the feedback information, and wherein the synchronizing among the plurality of paths comprises throttling the transmitting or seeking forward the transmitting on each of the paths.

\* \* \* \* \*